United States Patent [19]

Bell, Jr.

[11] Patent Number: 4,580,343

[45] Date of Patent: Apr. 8, 1986

[54] FRUIT SLICING AID

[76] Inventor: DeWitt T. Bell, Jr., 308 Gran Ave., Birmingham, Ala. 35209

[21] Appl. No.: 680,061

[22] Filed: Dec. 10, 1984

[51] Int. Cl.⁴ .............................................. A47J 43/18

[52] U.S. Cl. .......................................... 30/114; 269/3; D7/43; 30/303

[58] Field of Search ................. 30/114, 124, 286, 303; 269/1, 13; 83/821; D7/43

[56] References Cited

U.S. PATENT DOCUMENTS

| | | | |
|---|---|---|---|
| 563,652 | 7/1896 | Bulette | D7/43 |
| 1,462,717 | 7/1923 | Maus | 269/3 |
| 1,744,422 | 1/1930 | Taylor | D7/43 |
| 2,824,588 | 2/1958 | Lyon et al. | 30/114 |
| 3,060,838 | 10/1962 | Priore | 30/114 |

*Primary Examiner*—Jimmy C. Peters

*Attorney, Agent, or Firm*—Jennings, Carter, Thompson & Veal

[57] ABSTRACT

A fruit slicing aid for use with non-drupaceous fruit of various sizes utilizes a hollow conical upright member within which the fruit is held. The walls of the upright member have vertical slots cooperatively aligned such that a knife-like slicing member may be inserted and urged downwardly to slice the fruit. An attached base provides stability and a stop limits downward movement of the slicing member.

6 Claims, 6 Drawing Figures

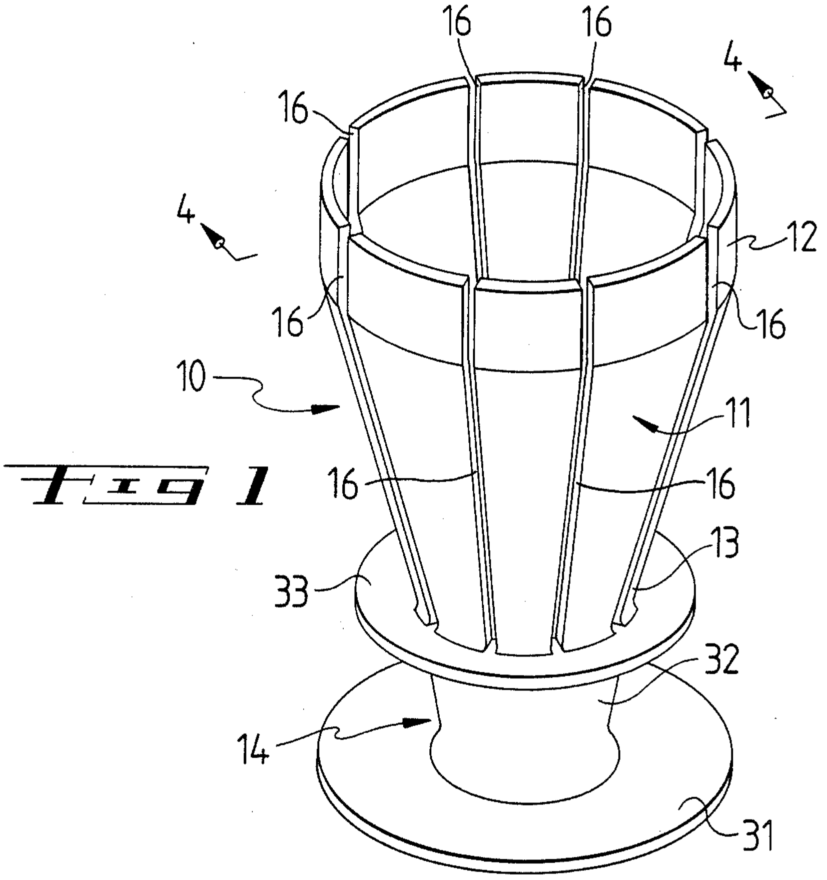
Fig 1
Fig 2
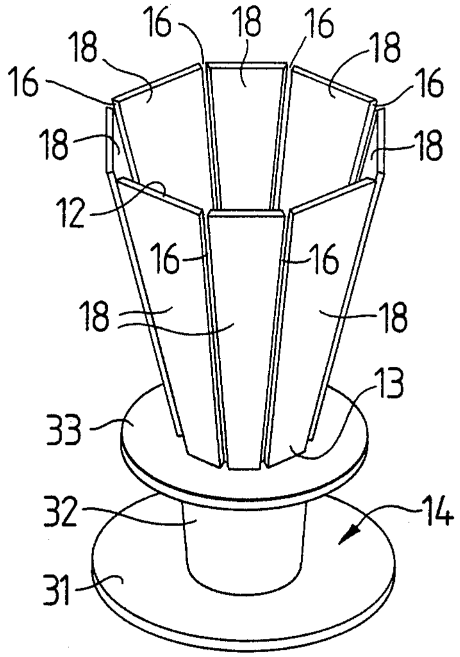
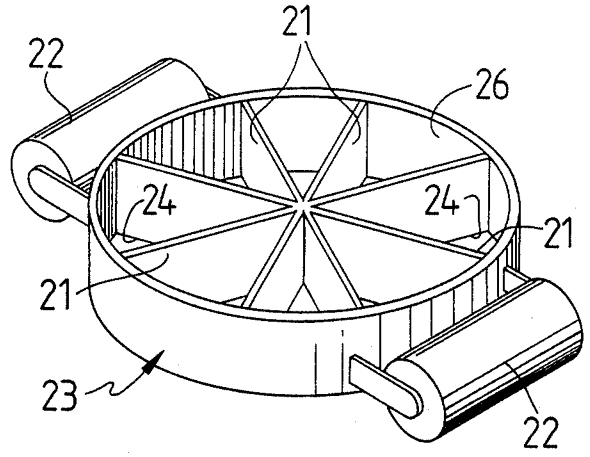
Fig 6

FRUIT SLICING AID

BACKGROUND OF THE INVENTION

The instant invention relates to fruit slicing apparatus and more particularly to fruit slicing apparatus wherein the fruit is cooperatively held within a positioning member during the cleaving action of a slicing member. More particularly the invention relates to a fruit slicing apparatus for universal use in sectioning fruits of the non-drupaceous variety.

Numerous beverages and salads are prepared using slices of fruits such as citrus fruits and tomatoes. In commercial establishments many such fruits are sliced daily and consequently employees of such establishments are required to prepare such fruits as a part of their routine duties. Although the hazards associated with the preparation of fruits for such uses are not life-threatening, it is nonetheless true that the numerous nicks and abrasions suffered by the fingers and the hands as a result of handling the oftentimes slippery fruit to position and hold the same for slicing with a sharp knife, are painful and vexatious. Likewise, the time spent positioning the fruit to assure the proper cut and then repositioning the fruit for the multiple cuts is minimal when slicing a single fruit; however, when numerous fruit are to be so prepared the total time is not inconsequential. Furthermore manual sliding of such fruits leaves something to be desired in terms of sanitation.

SUMMARY OF THE INVENTION

It is an object of the invention to provide a safe means for slicing non-drupaceous fruit into sections wherein the fruit is held within a protective container.

Yet another object of the invention is to provide a means for rapidly and efficiently slicing such fruit into sections.

Another object of the invention is to provide a sanitary means for slicing such fruit into sections.

Yet another object of the invention is to provide a means consonant with the above objects which is universally useful with fruits of various sizes in that the fruits are automatically positioned for slicing within said apparatus.

To accomplish the above objects, my invention utilizes a hollow conical upright member positioned on a base member such that the upright member tapers inwardly from the upper end to the lower end. About the walls of the upright member are a plurality of vertical slots extending downwardly from the upper end. The selected fruit is placed within the upright member whereby the fruit will descend until the walls of the upright member engage the fruit in a supporting fashion at a point dependent upon the shape and size of the fruit. A slicing element is then engaged within the slots and urged downwardly to slice through the captured fruit in the desired manner.

Although the instant invention is quite simple, it is also quite efficient and quite safe, and is more sanitary than manually handling the fruit.

DESCRIPTION OF THE DRAWINGS

Apparatus embodying features of my invention is shown in the drawings, forming a part of this application, in which:

FIG. 1 is a perspective view of one embodiment of the fruit slicing aid;

FIG. 2 is a perspective view of a modified form of the fruit slicing aid showing the upper section to be made of planar wedges;

FIG. 6 is a perspective view of a co-planar knife-like blade which may be employed.

DESCRIPTION OF A PREFERRED EMBODIMENT

Figure 5:
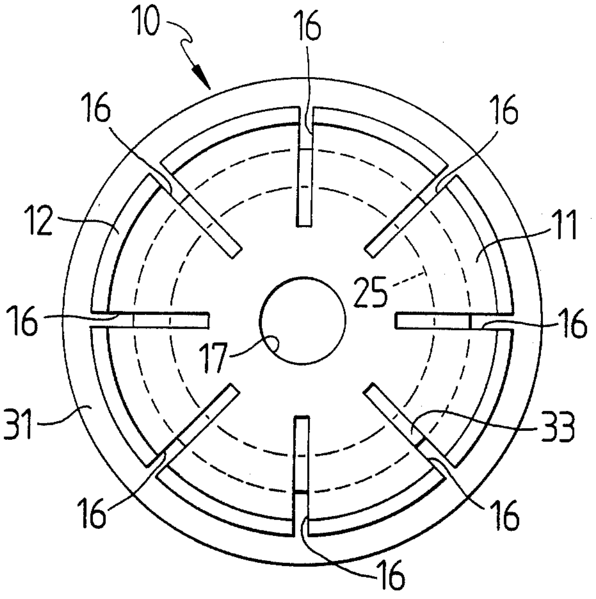
FIG. 5 is a top plan view of the apparatus shown in FIG. 4.

Referring to FIG. 1 wherein my fruit slicing aid is shown generally at 10, it will be seen that my fruit slicing aid comprises an upright member 11 which is generally conically shaped, having an upper end 12 and being tapered downwardly toward a lower end 13 which is attached to a base 14. The conical wall of the upright member 11 is provided with a plurality of oppositely disposed slots 16 which may open upwardly at the upper end 12 of the upright member and extend downwardly therethrough to a region proximal yet above the base 14 which supports upright member 11. The base 14 is attached to the lower end 13 of the upright member and may extend outwardly therefrom to provide substantial lateral support to avoid inadvertent overturning of the apparatus. Both lower end 13 and the base 14 are open as shown at 17 in FIG. 5 with the openings thereof cooperatively positioned together. The base 14 is preferentially formed from a horizontally extending planar member 31 which rests on a counter top or table top. Supported by the planar member 31 is a generally vertical tubular section 32 which is joined to the lower portion of the upright member 11. The vertical section 32 is of sufficient height to allow the fruit slicing aid 10 to be grasped by a hand. Extending horizontally and radially from the top of the vertical section 32 is an annular flange or rim 33 which serves as a knife stop or guard to stop the downward movement of the means employed to slice the fruit.

FIG. 2 shows a modification of upright member 11 which utilizes a plurality of planar wedge-shaped members 18 which also taper from upper portion 12 to lower portion 13 and which define a lower opening 17. The slots 16 are located intermediate selected wedge-shaped members 18 which terminate at the lower end 13, as shown.

Figure 3:
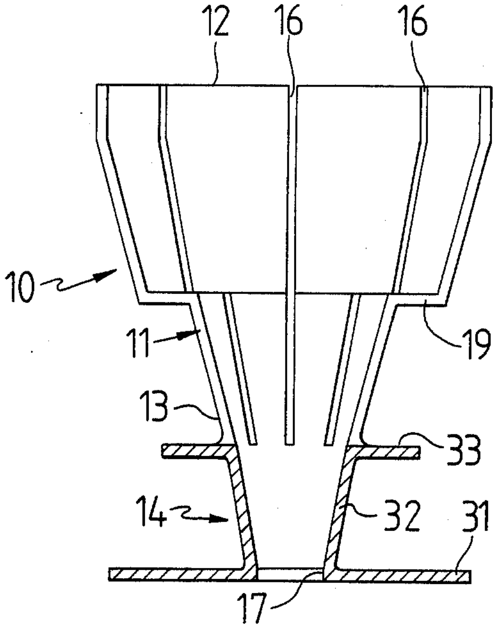
FIG. 3 is a vertical sectional view showing another modification in which the upright conical member is stepped in diameter.

Yet another embodiment of my invention is shown in FIG. 3 wherein the upper end 12 is much larger in diameter than lower end 13. The overall height of the upright member 11 is maintained within a reasonable tolerance by the use of an intermediate shoulder 19 which serves to substantially reduce the diameter of the upright member at one or more selected levels intermediate upper end 12 and lower end 13. Thus the uppper section of this embodiment may be used for larger fruits such as grapefruit, while the lower section of the same apparatus would be appropriate for such fruits as lemons and limes.

Figure 4:
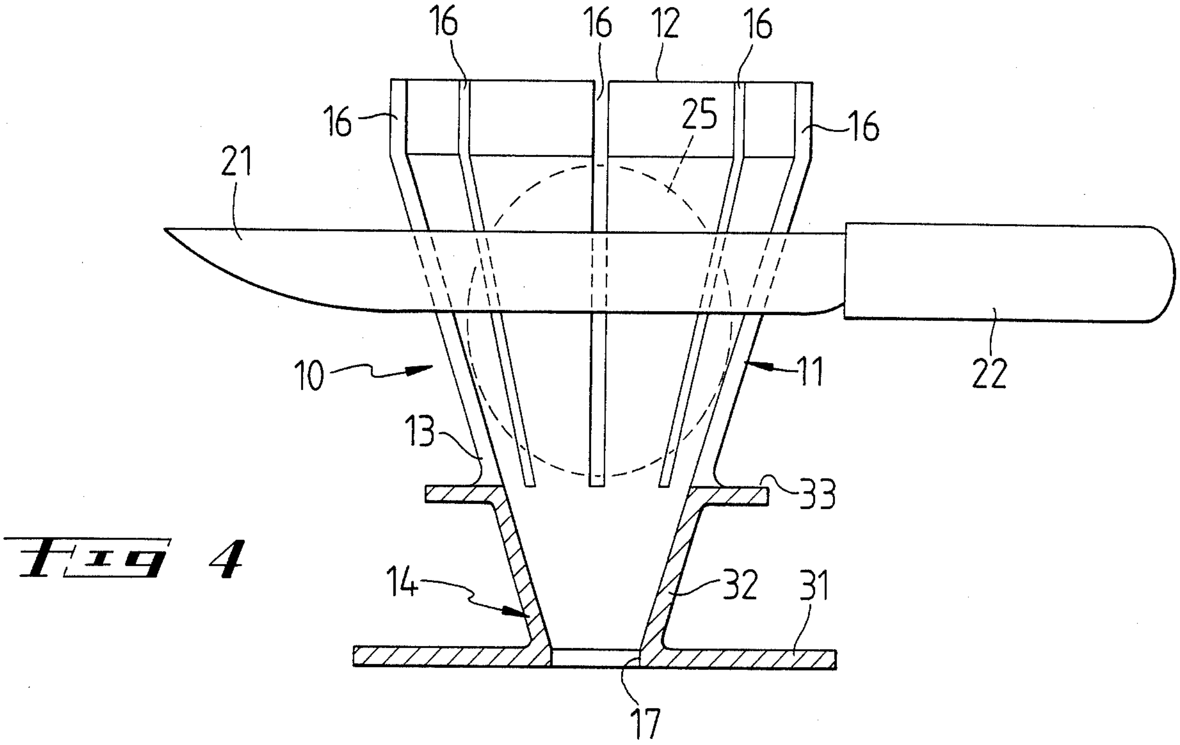
FIG. 4 is a sectional view taken along line 4—4 of FIG. 1 showing a slicing means.

Of course, there is required some means for slicing through the fruit. This may be provided by a simple knife-like element 21 having handles 22 connected thereto and adapted for slidingly engaging the slots 16, as shown in FIG. 4, such that the handle 22 is positioned outwardly of the upper portion of the upright member 11 and the knife-like element, or blade, 21 extends transverse the upright member between slots 16 and thereby forms a chord across the volume of the upright member 11. The knife-like element 21 is then urged downwardly through a selected fruit within the upright member 11, thereby slicing the fruit as desired. A simple knife-like element such as shown at 21 would require the user to retract the knife-like element from the engaged slots 16 and reinsert the knife-like element through other slots 16 in the upright member 11 in order to slice the selected fruit into sections other than half sections. This may be more readily accomplished through the use of a sectioning blade as shown generally at 23 in FIG. 6 wherein a plurality of knife-like blades 21 are mounted in the same plane with the cutting edges 24 thereof aligned in the same direction. The co-planar knife-like blades 21 are held in their angular position by a ring 26 which also serves to mount handles 22 to the sectioning blade 23. The plurality of knife-like blades 21 are configured to cooperatively engage the slots 16 such that a single downward motion effectively slices a selected fruit captured within upright member 11.

In operation, the fruit is simply placed in the upright member 11 and allowed to descend until the fruit is engaged by the inner surfaces of upright member 11. The fruit will thus be supported and captured by the inner surfaces of upright member 11 after having descended within the upright member a distance proportional to the size of the fruit, as shown in dash lines 25 in FIG. 4. With some fruits it may be desirable to position the fruit such that the stem of the fruit is maintained in an upright position as when the invention is used with apples; however, the time and effort expended in so doing is quite minimal. The slicing means is then urged through the fruit, which is thereby sectioned.

It should be recognized that a highly practical and efficient, as well as safe and sanitary, apparatus for slicing non-drupaceous fruit of most sizes, with the exception of large melons, has been herein disclosed.

While I have shown my invention in several forms, it will be obvious to those skilled in the art that it is not so limited, but is susceptible of various other changes and modifications without departing from the spirit thereof.

What I claim is:

1. An apparatus for slicing non-drupaceous fruit comprising:

(a) a base member;

(b) a substantially conical, hollow, upright member tapering from its upper end to its lower end having therein at least one horizontal shoulder intermediate said upper and lower end, with said lower end cooperatively supported by said base member and with said upright member having at least two oppositely disposed, vertically extending slots therein extending from said upper end downward to a height above and proximal said base member.

2. An apparatus for slicing non-drupaceous fruit comprising:

(a) a base member; and (b) a substantially conical, hollow, upright member tapering from its upper end to its lower end and having therein a horizontal shoulder, with said lower end cooperatively supported by said base member and with said upright member having at least two oppositely disposed, vertically extending slots therein extending from said upper end downward to a height above and proximal said base member, with said base member having a central aperture cooperatively aligned with the lower end of said upright member.

3. The apparatus of claim 2 wherein said upright member comprises a plurality of planar wedge shape members aligned along chords of a cone with each wedge-shaped member adjoining the adjacent wedge-shaped members at the lower end of said upright member and said vertically extending slots extending downwardly between selected wedge-shaped members.

4. The apparatus of claim 2 wherein said base member extends radially from said central aperture so as to provide lateral stability to said upright member.

5. An apparatus for slicing non-drupaceous fruit comprising:

(a) a horizontal planar base member;

(b) a substantially conical, hollow, upright member tapering from its upper end to its lower end, with said lower end cooperatively supported by said base member and with said upright member having at least two oppositely disposed, vertically extending slots therein extending from said upper end downward to a height above and proximal said base member, (c) a generally vertical tubular member connecting said planar base member to said conical upright member, and (d) an annular flange extending radially from the junction of said vertical tubular member and said conical upright member.

6. The apparatus of claim 5 wherein said base member has an aperture, extending vertically therethrough, cooperatively aligned with the lower end of said conical upright member.

* * * * *